United States Patent
Kim et al.

(10) Patent No.: US 11,314,978 B2
(45) Date of Patent: Apr. 26, 2022

(54) CALIBRATION METHOD FOR FINGERPRINT SENSOR AND DISPLAY DEVICE USING THE SAME

(71) Applicant: SAMSUNG DISPLAY CO., LTD., Yongin-si (KR)

(72) Inventors: Mun Su Kim, Yongin-si (KR); Kee Yong Kim, Yongin-si (KR); Jung Hun Sin, Yongin-si (KR); Han Su Cho, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/009,030

(22) Filed: Sep. 1, 2020

(65) Prior Publication Data

US 2021/0158069 A1 May 27, 2021

(30) Foreign Application Priority Data

Nov. 27, 2019 (KR) .................. 10-2019-0154766

(51) Int. Cl.
*G06K 9/20* (2006.01)
*G06K 9/03* (2006.01)
*G06K 9/00* (2022.01)
*G09G 3/3208* (2016.01)

(52) U.S. Cl.
CPC ........... *G06K 9/036* (2013.01); *G06K 9/0004* (2013.01); *G06K 9/209* (2013.01); *G06K 9/2027* (2013.01); *G06K 9/2036* (2013.01); *G09G 3/3208* (2013.01)

(58) Field of Classification Search
CPC ........... G06K 9/0004; G06K 9/00006–9/0012; G06K 9/20–9/348
See application file for complete search history.

(56) References Cited

U.S. PATENT DOCUMENTS

| 10,296,771 | B2 | 5/2019 | Zhang | |
| 2004/0156555 | A1* | 8/2004 | Irving | ............... H04L 12/40117 382/274 |
| 2018/0046281 | A1 | 2/2018 | Pi et al. | |
| 2019/0050619 | A1* | 2/2019 | Kern | ..................... G06K 9/036 |
| 2019/0311176 | A1* | 10/2019 | Haddad | ................ G06K 9/0004 |

FOREIGN PATENT DOCUMENTS

KR 10-1857933 5/2018
KR 10-1928319 12/2018

* cited by examiner

*Primary Examiner* — Brian Werner
(74) *Attorney, Agent, or Firm* — F. Chau & Associates, LLC

(57) ABSTRACT

Provided herein are a calibration method for a fingerprint sensor and a display device using the calibration method, where, in the calibration method for a fingerprint sensor, the fingerprint sensor includes a substrate, a light-blocking layer located on a first surface of the substrate and having openings formed in a light-blocking mask, a light-emitting element layer located on the light-blocking layer and having a plurality of light-emitting elements, and a sensor layer located on a second surface of the substrate and having a plurality of photosensors; and the calibration method includes generating calibration data through white calibration and dark calibration, and applying offsets to the plurality of photosensors using the calibration data.

11 Claims, 9 Drawing Sheets

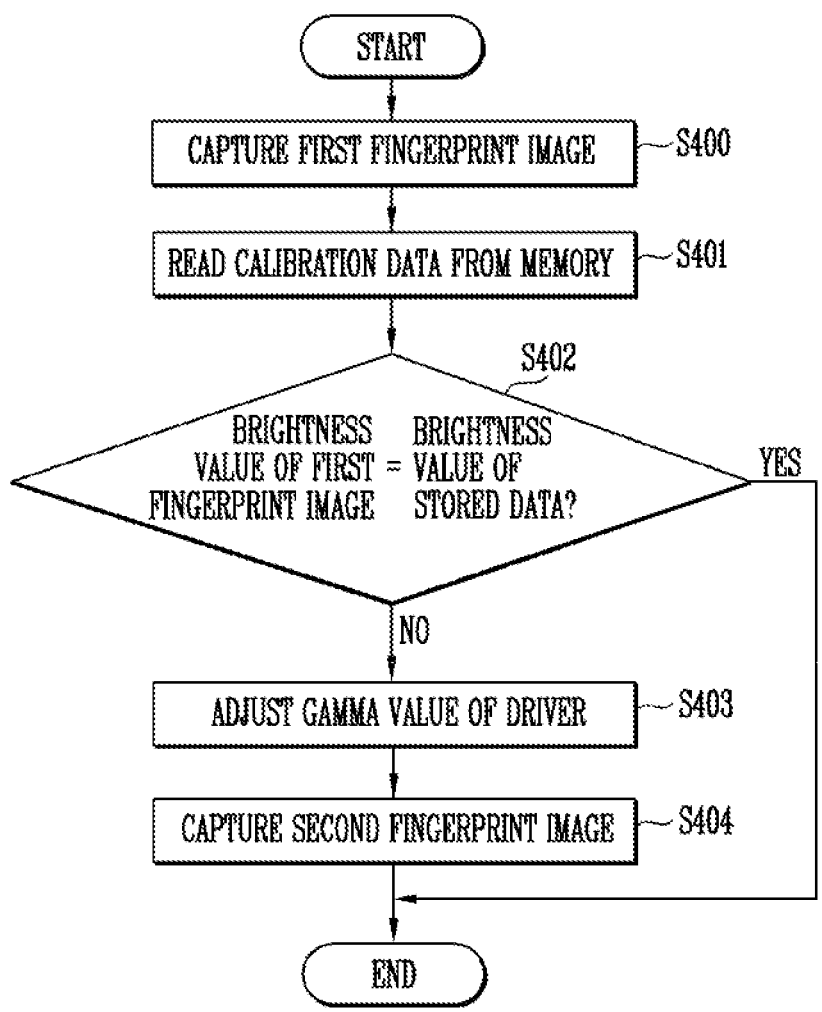

CALIBRATION METHOD FOR FINGERPRINT SENSOR AND DISPLAY DEVICE USING THE SAME

CROSS-REFERENCE TO RELATED APPLICATION

This application claims priority under 35 U.S.C. § 119 to, and the benefit of, Korean Patent Application No. 10-2019-0154766 filed on Nov. 27, 2019 in the Korean Intellectual Property Office (KIPO), the entire content of which is incorporated herein by reference.

TECHNICAL FIELD

Embodiments of the present disclosure relate to a calibration method for a fingerprint sensor, and to a display device using the calibration method.

DISCUSSION OF RELATED ART

A display device, which is a device for displaying an image, may comprise a display panel, such as an organic light-emitting diode display panel or a liquid crystal display panel.

An organic light-emitting diode (OLED) display device is a type of self-emissive display device. An OLED display device comprises an organic light-emitting layer interposed between a pixel electrode and a counter electrode. When the two electrodes respectively inject an electron and a hole into the organic light-emitting layer, an exciton is generated due to a combination of the electron and the hole, and light is generated while the exciton falls from an excited state to a ground state.

The display device may comprise a fingerprint sensor for fingerprint sensing. A photo-sensing type of fingerprint sensor may comprise a light source and a photosensor. The photosensor may receive reflected light generated by a user's fingerprint, and a fingerprint detector may detect the fingerprint by generating and processing an original image based on the reflected light.

The reflected light received by the photosensor may contain noise, or the original image may contain noise or errors due to deviation of the photosensor or deviation from an optical path. To remove noise from the original image, the fingerprint detector may calibrate the original image.

SUMMARY

Exemplary embodiments of the present disclosure are directed towards a calibration method for a fingerprint sensor which can improve calibration precision.

An exemplary embodiment calibration method for calibrating a fingerprint sensor comprising a plurality of photosensors includes: generating calibration data through white calibration and dark calibration; and applying offsets to the plurality of photosensors using the calibration data.

An exemplary embodiment of the present disclosure provides a calibration method for a fingerprint sensor. The fingerprint sensor may comprise a substrate, a light-blocking layer located on a first surface of the substrate and having openings formed in a light-blocking mask, a light-emitting element layer located on the light-blocking layer and having a plurality of light-emitting elements, and a sensor layer located on a second surface of the substrate and having a plurality of photosensors.

The calibration method may comprise generating calibration data through white calibration and dark calibration, and applying offsets to the plurality of photosensors using the calibration data.

Generating the calibration data may comprise disposing a first reflector having a flat reflective surface on the first surface of the substrate so that the first reflector overlaps the sensor layer in a thickness direction.

The first reflector may comprise a skin color reflector and a black reflector, and the white calibration may be performed using the skin color reflector, and the dark calibration may be performed using the black reflector.

The white calibration may comprise first, second and third white calibration operations of measuring received light amounts of the sensor layer corresponding to first, second and third brightness values of the light-emitting elements, and the dark calibration may comprise first, second and third dark calibration operations of measuring received light amounts of the sensor layer corresponding to the first, second and third brightness values of the light-emitting elements.

The third brightness value of the light-emitting elements may be higher than the second brightness value, and the second brightness value may be higher than the first brightness value.

A light reception period of the sensor layer in the white calibration may be longer than a light reception period of the sensor layer in the dark calibration.

A light reception period of the sensor layer in the first white calibration operation may be longer than a light reception period of the sensor layer in each of the second and third white calibration operations.

Generating the calibration data may further comprise measuring a received light amount of the sensor layer in each of the first, second and third white calibration operations and the first, second and third dark calibration operations, and determining whether a corresponding calibration operation is a normal operation by checking whether the measured received light amount of the sensor layer is within a preset range.

The preset range may be designated such that a luminance or brightness value corresponding to the received light amount of the sensor layer, which is higher than a reference brightness value by a threshold amount of 400 candela per square meter ($cd/m^2$), for example, is set as an upper limit and such that the brightness value corresponding to the received light amount of the sensor layer, which is lower than the reference brightness value by the threshold amount of 400 $cd/m^2$, for example, is set as a lower limit.

A panel driver configured to control brightness values of the light-emitting elements may be used.

The calibration method may further comprise resetting the panel driver when the received light amount of the sensor layer is outside of the preset range.

The calibration method may further comprise generating a test image of a second reflector comprising an uneven reflective surface with an irregularity based on sensing signals provided from the photosensors, detecting a shape of the irregularity of the second reflector by calibrating the test image using the calibration data, and performing a noise checking operation of determining whether generation of the calibration data is normally performed based on the shape of the irregularity of the second reflector.

An exemplary embodiment program storage device includes instructions for: generating calibration data through white calibration and dark calibration; and applying offsets to a plurality of photosensors based on the calibration data, wherein the white calibration is performed using a substantially skin-colored reflector and the dark calibration is performed using a substantially gray-colored reflector, wherein the white calibration comprises a plurality of calibration operations measuring received light amounts by the plurality of photosensors corresponding to a first plurality of brightness values, and wherein the dark calibration comprises a plurality of dark calibration operations measuring received light amounts by the plurality of photosensors corresponding a second plurality of brightness values.

An exemplary embodiment of the present disclosure may provide a display device. The display device may comprise a substrate, a light-blocking layer located on a first surface of the substrate and having openings formed in a light-blocking mask, a circuit-element layer located on the light-blocking layer and having at least one conductive layer in which circuit elements are located, a light-emitting element layer located on the circuit-element layer and having light-emitting elements, a sensor layer located on a second surface of the substrate and having a plurality of photosensors, a driving circuit comprising a panel driver configured to generate a first driving signal for controlling the light-emitting elements and a second driving signal for controlling the photosensors, and a fingerprint detector configured to detect a fingerprint based on sensing signals provided from the photosensors, and a memory configured to store calibration data generated through calibration.

The driving circuit may be configured to generate a first fingerprint image by capturing an image of the fingerprint through the fingerprint detector, compare a brightness value of the first fingerprint image with the calibration data, and adjust brightness values of the light-emitting elements through the panel driver when a difference between the brightness values of the first fingerprint image and the calibration data is outside of a preset range, and generate a second fingerprint image by re-capturing an image of the fingerprint through the fingerprint detector.

The calibration may be configured to generate the calibration data through white calibration and dark calibration.

The calibration data may be generated using a first reflector located on the first surface of the substrate to overlap the sensor layer in a thickness direction and configured to have a flat reflective surface.

The first reflector may comprise a skin color reflector and a black reflector, and the white calibration may be performed using the skin color reflector, and the dark calibration is performed using the black reflector.

The white calibration may comprise first, second and third white calibration operations of measuring received light amounts of the sensor layer corresponding to first, second and third brightness values of the light-emitting elements, and the dark calibration may comprise first, second and third dark calibration operations of measuring received light amounts of the sensor layer corresponding to the first, second and third brightness values of the light-emitting elements.

The third brightness value of the light-emitting elements may be higher than the second brightness value, and the second brightness value may be higher than the first brightness value.

The calibration data may be generated by measuring a received light amount of the sensor layer in each of the first, second and third white calibration operations and the first, second and third dark calibration operations, checking whether the measured received light amount of the sensor layer is within a preset range, and then determining whether a corresponding calibration operation is a normal operation.

The panel driver may be reset when the received light amount of the sensor layer is outside of the preset range.

BRIEF DESCRIPTION OF THE DRAWINGS

The above and other aspects of the present disclosure will become more apparent by describing in further detail embodiments thereof with reference to the accompanying drawings, in which:

FIG. 14 is a flowchart diagram illustrating a calibration method for a display device according to an exemplary embodiment of the present disclosure.

DETAILED DESCRIPTION

Figure 1:
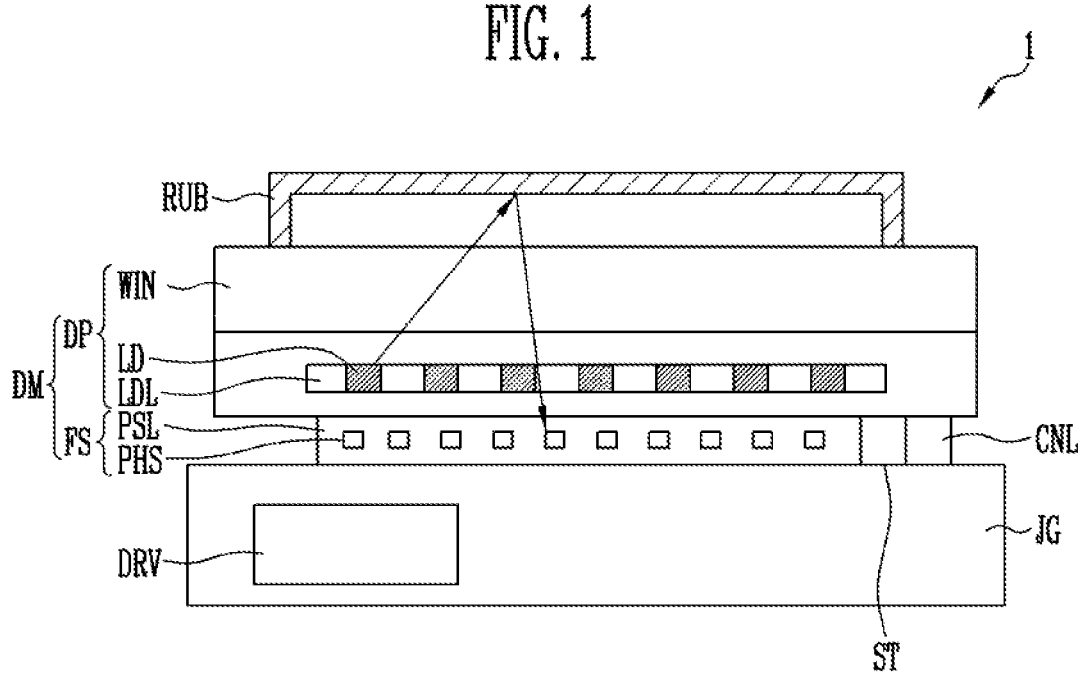
FIG. 1 is a schematic diagram illustrating a preliminary calibration device for a fingerprint sensor according to an exemplary embodiment of the present disclosure.

Throughout the drawings, same or like reference numerals may be used to designate same or like elements. Further, the thicknesses, ratios, and sizes of elements in the drawings may be exaggerated to make the technical description more effective. The term "and/or" comprises all of one or more combinations that can be defined by an associated element or elements.

It will be understood that, although the terms "first" and "second" may be used herein to describe various elements, these elements should not be limited by these terms. These terms are only used to distinguish one element from other elements. For instance, a first element discussed below could be termed a second element without departing from the teachings of the present disclosure. Similarly, the second element could also be termed the first element. In the present disclosure, the singular forms are intended to comprise the plural forms as well, unless the context clearly indicates otherwise.

Furthermore, the terms "under," "below," "on," and "above" are used to describe spatial relativity between elements illustrated in the drawings. The terms correspond to a relative concept, which will be described based on a direction indicated in the drawings.

In the present specification, it should be understood that the terms such as "comprise" or "have" are merely intended to indicate that features, numbers, steps, operations, components, parts, or combinations thereof are present, and are not intended to exclude the possibility that one or more other features, numbers, steps, operations, components, parts, or combinations thereof may be present or added.

Figure 2:
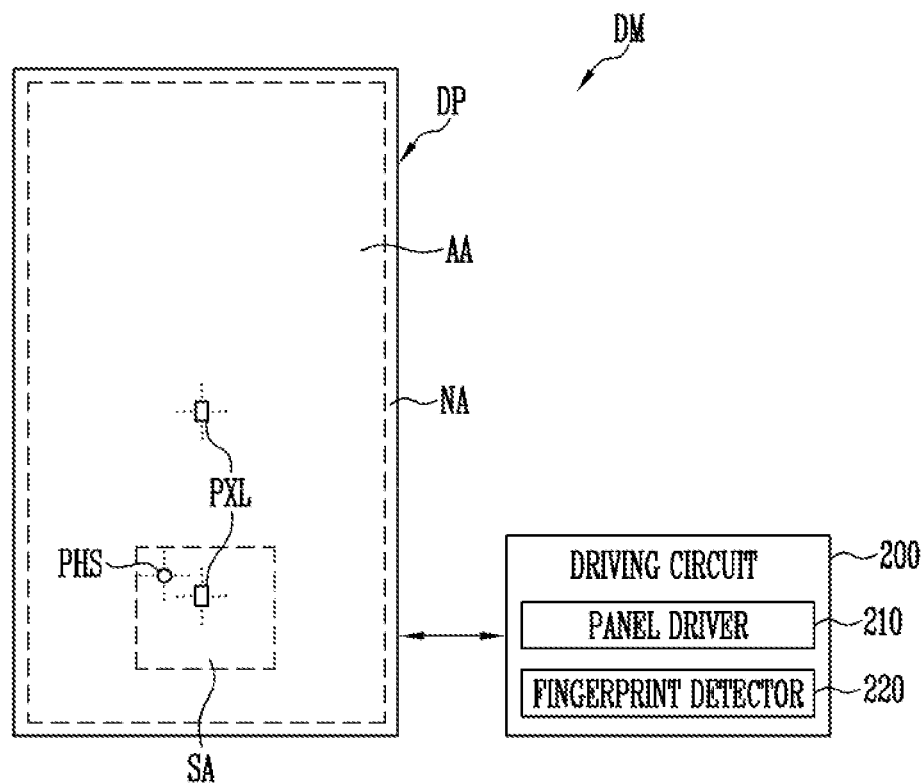
FIG. 2 is a schematic plan view illustrating a display module according to an exemplary embodiment of the present disclosure.
Figure 3:
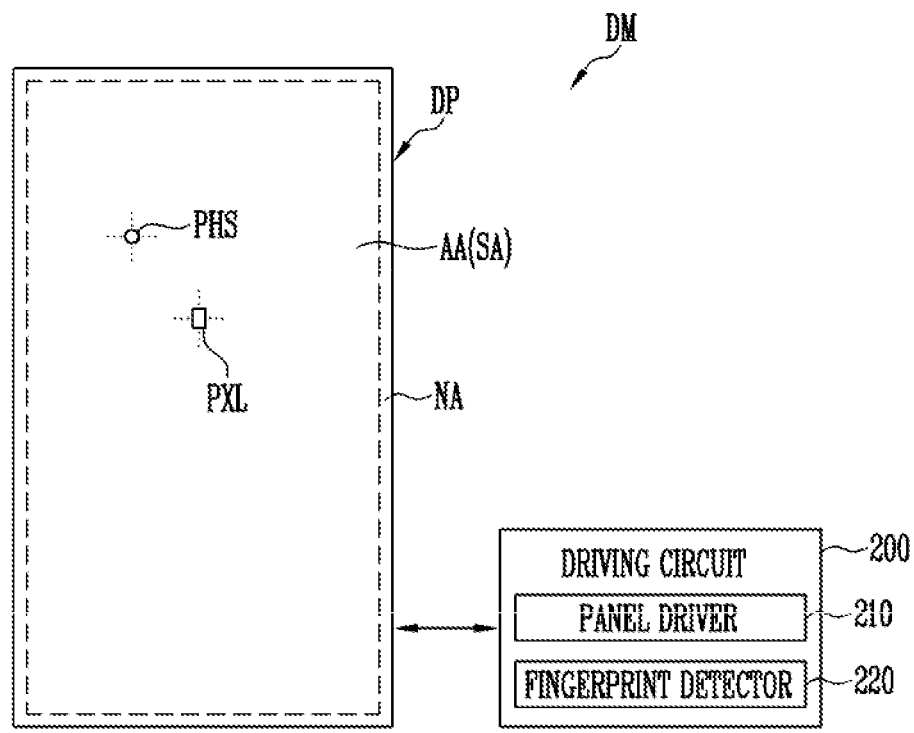
FIG. 3 is a schematic plan view illustrating a display module according to an exemplary embodiment of the present disclosure.

FIG. 1 illustrates a preliminary calibration device for a fingerprint sensor according to an exemplary embodiment of the present disclosure. FIG. 2 illustrates a display module according to an exemplary embodiment of the present disclosure. FIG. 3 also illustrates a display module according to an exemplary embodiment of the present disclosure.

Referring to FIGS. 1 to 3, a preliminary calibration device 1 for a fingerprint sensor may comprise a jig JG and a reflector RUB for performing preliminary calibration of a fingerprint sensor FS of a display module DM.

In accordance with an embodiment, the jig JG may comprise a stage ST which supports the display module DM, a driver DRV which generates a plurality of signals for driving the display module DM, and a connecting line CNL which transfers the plurality of signals generated by the driver DRV to the display module DM. The driver DRV may perform the same or similar function at a different time as a driving circuit 200 of the display module DM, which will be further described later. That is, the driving circuit 200 of the display module DM may not be operated during the preliminary calibration of the fingerprint sensor FS, and the driver DRV of the jig JG may perform the function of the driving circuit 200, instead of the driving circuit 200. Therefore, a description of the driver DRV may be replaced with a description of the driving circuit 200, which will be described later.

In accordance with an embodiment, the reflector RUB may be an object having a reflective surface opposite a first surface of the display module DM. The reflective surface may be parallel to the first surface of the display module DM. The reflective surface may be a flat surface without having irregularities.

The reflector RUB may have the shape of a cuboid or rectangular parallelepiped having one open surface. The reflector RUB may be located on the first surface of the display module DM so as to perform preliminary calibration of the fingerprint sensor FS, and may be arranged to overlap the fingerprint sensor FS in the thickness direction. That is, the reflector RUB may be located to cover the fingerprint sensor FS so that light emitted from light-emitting elements LD of the display module DM is reflected by the reflector RUB and the reflected light is incident on the photosensors PHS.

The reflector RUB may comprise a skin color reflector to be used for white calibration, which will be further described later, and a black reflector to be used for dark calibration, which will be further described later. Each of the skin color reflector and the black reflector assumes a user's finger is the target of sensing by the fingerprint sensor FS, wherein the reflectivity of the skin color reflector may be, for example, about 70%. The sensing state of the fingerprint sensor FS may change with a usage environment, such as weather and a use time zone, and may also change according to a substance, such as water on the finger. To achieve such a change, the black reflector may have reflectivity lower than that of the skin color reflector. For example, the reflectivity of the black reflector may be less than 70% to about 0%, such as about 50%.

Although, for convenience of description, the display module DM is illustrated as being separated into the display panel DP and the driving circuit 200 in FIGS. 2 and 3, the present disclosure is not limited thereto. In greater detail, all or part of the driving circuit 200 may be integrated into the display panel DP.

Referring to FIGS. 2 and 3, the display module DM may comprise the display panel DP and the driving circuit 200 for driving the display panel DP.

The display panel DP may comprise a display area AA and a non-display area NA. The display area AA may be an area in which a plurality of pixels PXL (or also referred to as "sub-pixels)" are provided, and may be designated as an active area. The pixels PXL may each comprise at least one light-emitting element. The display module DM displays an image in the display area AA by driving the pixels PXL in accordance with externally input image data.

The display area AA may comprise a sensing area SA. The sensing area SA may comprise at least some of the pixels PXL provided in the display area AA.

In an embodiment, as illustrated in FIG. 2, at least a part of the display area AA may be set as the sensing area SA. In an embodiment, as illustrated in FIG. 3, the entire part of the display area AA may be set as the sensing area SA.

Although an example in which only a single sensing area SA is formed in the display area AA is illustrated in FIG. 2, the technical spirit of the present disclosure is not limited thereto. That is, in an alternate embodiment, a plurality of sensing areas SA that are regularly or irregularly arranged may be formed in the display area AA. In such embodiments, the plurality of sensing areas SA may have identical or different sizes and shapes.

Although an example in which the sensing area SA is formed in at least a part of the display area AA is illustrated in FIG. 2, the technical spirit of the present disclosure is not limited thereto. That is, in an alternate embodiment, the display area AA and the sensing area SA may be provided to partially overlap each other.

The non-display area NA may be an area arranged around the display area AA, and may be designated as a non-active area. The non-display area NA may inclusively mean the remaining area other than the display area AA in the display panel DP. In an embodiment, the non-display area NA may comprise a wiring area, a pad area, various types of dummy areas, or the like.

In an embodiment of the present disclosure, the display module DM may further comprise a plurality of photosensors PHS provided in the sensing area SA. In an embodiment, each photosensor PHS may sense reflected light that has been emitted from a light source (e.g., a pixel PXL) and reflected from the user's finger, and the display module DM may sense the user's fingerprint by analyzing the reflected light. Hereinafter, although an example in which the photosensors PHS are used to sense a fingerprint will be described, the photosensors PHS may be used to perform various functions, as in the case of a touch sensor or a scanner in alternate embodiments.

The photosensors PHS may be arranged or provided in the sensing area SA. Here, the photosensors PHS may be arranged to overlap at least some or all of the pixels PXL provided in the sensing area SA, or may be arranged near the pixels PXL. For example, at least some or all of the photosensors PHS may be provided between the pixels PXL.

In an embodiment in which the photosensors PHS are arranged adjacent to the pixels PXL, the photosensors PHS may use a light-emitting element, provided in at least one pixel PXL arranged in or near the sensing area SA, as a light source. In this embodiment, the photosensors PHS may constitute a photo-sensing type of fingerprint sensor, together with the pixels PXL of the sensing area SA, and in particular, light-emitting elements provided in the pixels PXL. In this way, when a fingerprint sensor-equipped display device is configured by using the pixels PXL as light sources without requiring a separate external light source, the thickness of a photo-sensing type of fingerprint sensor and the module of the display device equipped with the photo-sensing type of fingerprint sensor may be reduced, and manufacturing costs thereof may also be reduced.

In alternate embodiments, the photosensors PHS may be arranged or provided on an additional surface (e.g., a rear surface) facing a surface on which an image is displayed (e.g., a front surface) between two surfaces of the display panel DP.

The driving circuit 200 may drive the display panel DP. For example, the driving circuit 200 may output data signals corresponding to image data to the display panel DP or output driving signals for the photosensors PHS to the display panel DP, and may receive sensing signals from the photosensors PHS. The driving circuit 200 may detect the user's fingerprint (or the form of the fingerprint) using the sensing signals.

In an exemplary embodiment of the present disclosure, the driving circuit 200 may comprise a panel driver 210 and a fingerprint detector 220. For convenience of description, although the panel driver 210 and the fingerprint detector 220 are separately illustrated in FIGS. 2 and 3, the technical spirit of the present disclosure is not limited thereto. For example, at least a part of the fingerprint detector 220 may be integrated with the panel driver 210, or may be operated in conjunction with the panel driver 210.

The panel driver 210 may supply data signals corresponding to image data to the pixels PXL while sequentially scanning the pixels PXL in the display area AA. Accordingly, the display panel DP may display an image corresponding to the image data.

In an embodiment, the panel driver 210 may supply driving signals (e.g., first driving signals) for fingerprint sensing to the pixels PXL. The driving signals may be provided such that the pixels PXL emit light to function as light sources for the photosensors PHS. In this embodiment, the driving signals for fingerprint sensing may be provided to pixels PXL provided in a specific area of the display panel DP, such as, for example, pixels PXL provided in the sensing area SA.

The fingerprint detector 220 may provide or transfer driving signals (e.g., second driving signals) to the photosensors PHS for driving the photosensors, and may detect the user's fingerprint based on the sensing signals received from the photosensors PHS.

Figure 4:
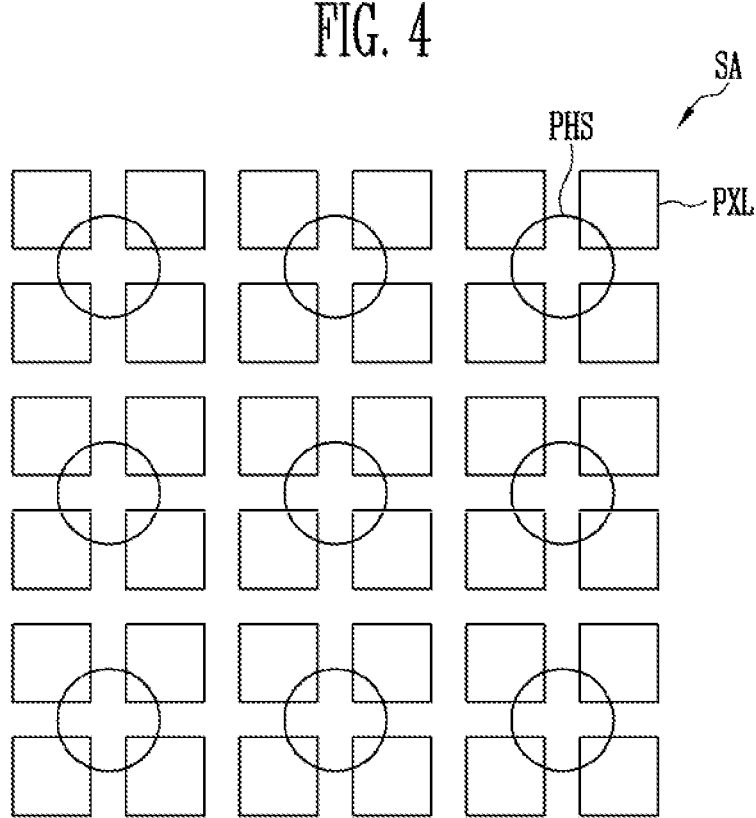
FIG. 4 is a schematic plan view illustrating an array structure of pixels and photosensors according to an exemplary embodiment of the present disclosure.

FIG. 4 illustrates an array structure of pixels and photosensors in accordance with an exemplary embodiment of the present disclosure.

Referring to FIG. 4, photosensors PHS may be arranged in a sensing area SA at a resolution lower than that of pixels PXL. In other words, a number of photosensors PHS less than the number of pixels PXL may be arranged in the sensing area SA. For example, one photosensor PHS may be arranged every four pixels PXL.

The photosensors PHS may be arranged between the pixels PXL to partially overlap the pixels PXL. In this embodiment, the photosensors PHS may have sizes greater than those of the pixels PXL. For example, each of the photosensors PHS may have a size sufficient to cover at least one pixel PXL.

However, an array structure of the pixels PXL and the photosensors PHS is not limited to the above-described structure. That is, the shapes, arrays, relative sizes, numbers, resolution, or the like of the pixels PXL and the photosensors PHS in the sensing area SA may be modified in various forms within the scope of the technical spirit of the present disclosure.

For example, the photosensors PHS may be arranged at the same resolution (density) as the pixels PXL in the sensing area SA. In other words, a number of photosensors PHS equal to the number of pixels PXL may be arranged in the sensing area SA. In this embodiment, the pixels PXL and the photosensors PHS may be arranged to form respective pairs in a one-to-one correspondence.

Further, the pixels PXL and the photosensors PHS may be arranged not to overlap each other, or may be arranged to completely overlap each other. In this embodiment, the photosensors PHS may have sizes less than or equal to those of the pixels PXL.

Although an example in which the photosensors PHS are regularly arranged in the sensing area SA is illustrated in FIG. 4, the technical spirit of the present disclosure is not limited thereto, and the photosensors PHS may be irregularly arranged in the sensing area SA in alternate embodiments.

Figure 5:
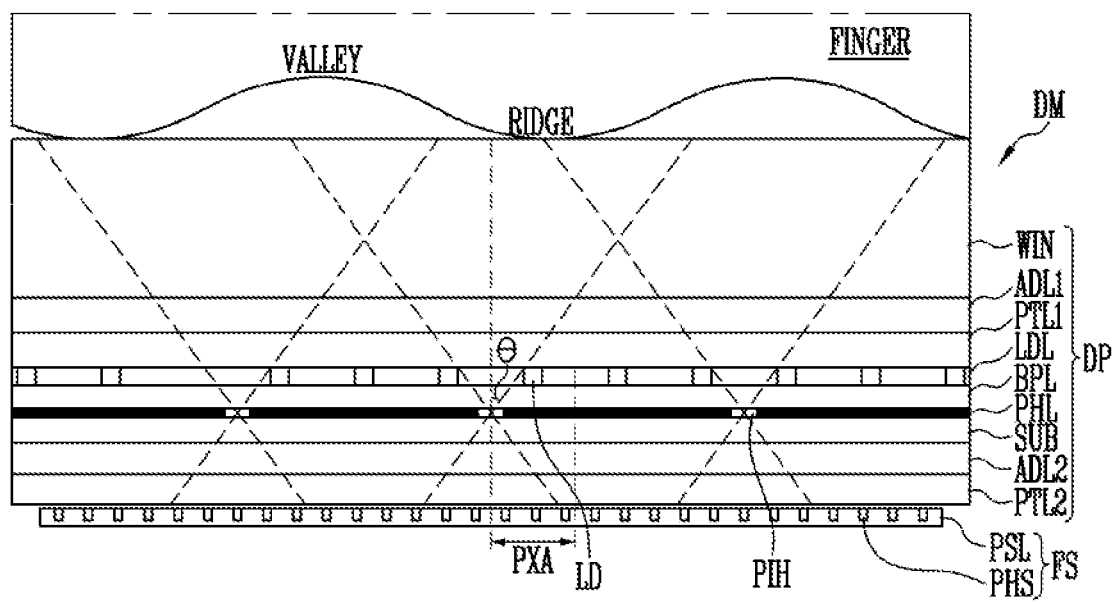
FIG. 5 is a schematic sectional view illustrating a display panel according to an exemplary embodiment of the present disclosure.

FIG. 5 illustrates a display panel according to an embodiment of the present disclosure. In particular, FIG. 5 is a sectional view of the display module DM, illustrated in FIGS. 2 and 3, in a sensing area SA.

Referring to FIG. 5, the sensing area SA of the display module DM according to embodiments of the present disclosure may comprise a display panel DP and a sensor layer PSL located on a first surface of the display panel DP. Also, the display module DM may comprise a substrate SUB, and a circuit-element layer BPL, a light-emitting element layer LDL, a first protective layer PTL1, a first adhesive layer ADL1, and a window WIN, which are sequentially located on a first surface (e.g., a top surface) of the substrate SUB. Further, the display module DM may comprise a second adhesive layer ADL2 and a second protective layer PTL2, which are sequentially located on a second surface (e.g., a bottom surface) of the substrate SUB.

The substrate SUB, which is a base material of the display panel DP, may substantially be a transparent light-transmissive substrate. The substrate SUB may be either a rigid substrate comprising glass or reinforced glass, or a flexible substrate made of a plastic material. However, the material of the substrate SUB is not limited thereto, and the substrate SUB may be made of any of various materials.

The substrate SUB may comprise a display area AA and a non-display area NA, such as those illustrated in FIGS. 2 and 3. Further, the display area AA may comprise a plurality of pixel areas PXA in which respective pixels PXL are arranged and/or formed.

The circuit-element layer BPL may be arranged on the first surface of the substrate SUB, and may comprise at least one conductive layer. For example, the circuit-element layer BPL may comprise a plurality of circuit elements (e.g., at least one transistor and capacitor) which constitute pixel circuits of the pixels PXL, and lines which supply various types of power and signals for driving the pixels PXL. In this case, the circuit-element layer BPL may comprise a plurality of conductive layers which form the circuit elements and the lines coupled to the circuit elements. Also, the circuit-element layer BPL may comprise at least one insulating layer provided between the plurality of conductive layers. Further, the circuit-element layer BPL may comprise a wiring component which is located in the non-display area NA of the substrate SUB and supplies power and signals, corresponding to the lines coupled to the pixels PXL, to the lines.

The light-emitting element layer LDL may be located on a first surface of the circuit-element layer BPL. The light-emitting element layer LDL may comprise a plurality of light-emitting elements LD coupled to the circuit elements and/or the lines of the circuit-element layer BPL via contact holes or the like. In an embodiment, at least one of the light-emitting elements LD may be arranged in each pixel area PXA.

Each of the pixels PXL may comprise circuit elements located in the circuit-element layer BPL and at least one light-emitting element LD located in the light-emitting element layer LDL on the top of the circuit-element layer BPL.

The first protective layer PTL1 may be located on the top of the light-emitting element layer LDL to cover the display area AA. The first protective layer PTL1 may comprise a sealing element, such as a thin-film encapsulation (TFE) layer or an encapsulation substrate, and may additionally comprise a protective film or the like in addition to the sealing element.

The first adhesive layer ADL1 may be interposed between the first protective layer PTL1 and the window WIN to couple the first protective layer PTL1 to the window WIN. The first adhesive layer ADL1 may contain a transparent adhesive, such as an optical clear adhesive (OCA), and may additionally contain various types of adhesive materials.

The window WIN may be a protective element located in an uppermost portion of the display module DM comprising the display panel DP, and may be an actually transparent light-transmissive substrate. Such a window WIN may have a multilayer structure selected from among a glass substrate, a plastic film, and a plastic substrate. The window WIN may comprise a rigid or flexible material, and the material used to form the window WIN is not especially limited.

In alternate embodiments of the present disclosure, the display module DM may further comprise a polarizing plate (not illustrated) and/or a touch sensor layer (or a touch electrode layer). For example, the display module DM may further comprise a polarizing plate and/or a touch sensor layer, which are interposed between the first protective layer PTL1 and the window WIN.

The second protective layer PTL2 may be arranged on a second surface of the substrate SUB. The second protective layer PTL2 may be coupled to the substrate SUB through the second adhesive layer ADL2.

The second adhesive layer ADL2 may firmly couple (or attach) the substrate SUB and the second protective layer PTL2 to each other. The second adhesive layer ADL2 may contain a transparent adhesive, such as OCA. The second adhesive layer ADL2 may contain a pressure sensitive adhesive (PSA) on which an adhesive material acts when pressure for bonding the second adhesive layer ADL2 to an adherend is applied. When the second adhesive layer ADL2 contains a pressure sensitive adhesive, the second adhesive layer ADL2 may be attached to the adherend using only pressure without requiring separate heat treatment or ultra-violet ray (UV) treatment.

In an embodiment of the present disclosure, the second adhesive layer ADL2 may contain a material which absorbs specific light or a material which blocks the specific light. For example, the second adhesive layer ADL2 may contain an infrared-absorbing material which absorbs infrared light having high energy density, or an infrared-shielding material which blocks the infrared light.

The infrared-absorbing material may comprise an inorganic oxide containing Antimony-Tin Oxide (ATO), Indium Tin Oxide (ITO), tungsten oxide, or carbon black, and a metal material, such as silver (Ag). The inorganic oxide may selectively transmit light in a visible light band, and may absorb infrared light. Further, the infrared-absorbing material may comprise, for example, organic dyes. The organic dyes may be dyes used for, for example, color filters (not illustrated) provided in the display panel DP.

The infrared-shielding material may comprise one or more selected from the group consisting of, for example, a borate mixture, a carbonate mixture, an aluminate mixture, a nitrate mixture, a nitrite mixture, lithium borate, sodium borate, potassium borate, magnesium borate, calcium borate, strontium borate, barium borate, Na2B4Ox, colemanite, lithium carbonate, sodium carbonate, potassium carbonate, calcium carbonate, calcite, CaCO3, dolomite, and magnesite. Also, the infrared-shielding material may be at least one of one or more types of dyes selected from the group consisting of nickel dithiol, dithiol metal complex, cyanine, squarylium, croconium, diammonium, aminium, ammonium, phthalocyanine, naphthalocyanine, anthraquinone, naphthoquinone, condensation polymer azo-based pyrrole, polymethine, and propylene-based compounds.

When the user's hand reaches (or is positioned on) the display surface (e.g., a surface on which an image is displayed) of the display module DM, the display module DM may perform a function of sensing the user's fingerprint through photosensors PHS, which will be described later. When external light flows into the display module DM while the user's fingerprint is sensed, a visible light band of the external light may be blocked by the user's hand, but infrared light may pass through the user's hand, and may then be incident on the photosensors PHS. The infrared light incident on the photosensors PHS may act as noise, thus decreasing the accuracy of recognition of light reflected from the user's hand.

As in the above-described embodiment of the present disclosure, when the second adhesive layer ADL2 contains an infrared-absorbing material and/or an infrared-shielding material, the infrared light of the external light is absorbed and/or blocked by the second adhesive layer ADL2 and is not incident on the photosensors PHS even if the infrared light of the external light passes through the user's hand, thus improving the accuracy of fingerprint recognition.

The second protective layer PTL2 may prevent a penetration of oxygen and moisture from the outside, and may be provided in a single-layer form or a multilayer form. The second protective layer PTL2 may be formed in the shape of a film, and may further secure the flexibility of the display panel DP. The second protective layer PTL2 may be coupled to the sensor layer PSL through an additional adhesive layer (not illustrated) which contains a transparent adhesive, such as OCA. Alternatively, in accordance with an embodiment, the second protective layer PTL2 may be formed of at least one layer that is capable of decreasing the refractive index of incident light.

In alternate embodiments, a selective light-shielding film may be further provided on the bottom of the second protective layer PTL2. The selective light-shielding film may block a specific frequency band contained in external light flowing into the display module DM, for example, an infrared light band, thus preventing the corresponding infrared light from being incident on the photosensors PHS of the sensor layer PSL. In the above description, although the selective light-shielding film is described as being further provided on the bottom of the second protective layer PTL2, the technical spirit of the present disclosure is not limited thereto. That is, in an embodiment, as long as the selective light-shielding film may be arranged on the top of the sensor layer PSL, the light-shielding film may be freely provided on any layer of the display module DM. Also, the selective light-shielding film may be omitted when a component for blocking infrared light is comprised in the display panel DP.

The light-blocking layer PHL may be interposed between the light-emitting element layer LDL and the sensor layer PSL, which will be described later. For example, the light-blocking layer PHL may be interposed between the substrate SUB and the circuit-element layer BPL, as illustrated in FIG. 5. In alternate embodiments of the present disclosure, the light-blocking layer PHL may comprise a plurality of pinholes PIH. The light-blocking layer PHL may block part of externally incident light, for example, reflected light that has been reflected from a finger, and may then enable the remaining part of the light to reach a bottom layer thereof through the pinholes PIH.

The widths (or diameters) of the pinholes PIH may be configured such that light satisfying a field of view FOV (θ, or also referred to as a "viewing angle") falling within a predetermined angle range can pass through each pinhole PIH.

Also, the widths (or diameters) of the pinholes PIH may be set to a value that is about more than ten times as large as the wavelength of reflected light, for example, 4 μm or 5 μm or more so that diffraction of light can be prevented. Further, the widths of the pinholes PIH may be set to a size sufficient to prevent an image blur and to more clearly sense the shape of a fingerprint. For example, the widths of the pinholes PIH may be set to a value less than or equal to about 20 μm. However, the present disclosure is not limited thereto, and the widths of the pinholes PIH may vary depending on the wavelength band of reflected light and/or the thickness of each layer of the module.

An interval (or a pitch) between adjacent pinholes PIH may be set in consideration of the distance between the light-blocking layer PHL and the sensor layer PSL and the wavelength range of reflected light. For example, the interval between adjacent pinholes PIH may be set to a value that is twice or more the distance between the light-blocking layer PHL and the sensor layer PSL, which will be described later, and may be set to a value that is equal to or greater than a value obtained by adding a predetermined error range to the distance. In this case, images observed by respective photosensors PHS may be prevented from overlapping each other, and thus an image blur may be prevented.

The sensor layer PSL may be attached to the second surface (e.g., a rear surface) of the display panel DM to overlap at least one region of the display panel DP. The sensor layer PSL may be arranged to overlap the display panel DP in at least the display area AA. Such a sensor layer PSL may comprise a plurality of photosensors PHS that are distributed at a predetermined resolution and/or at a predetermined interval. The intervals between the photosensors PHS may be densely set such that light reflected from an observation target (e.g., a specific area of a finger, such as a fingerprint area) is incident on at least two neighboring photosensors PHS.

The photosensors PHS of the sensor layer PSL may receive reflected light passing through the pinholes PIH, and may output an electrical signal corresponding to the reflected light as a sensing signal. Reflected light components that are incident on respective photosensors PHS may have different optical characteristics (e.g., frequency, wavelength, intensity, or the like) depending on whether the corresponding reflected light is generated due to the valley or ridge of the fingerprint formed on the user's finger). Therefore, the photosensors PHS may output sensing signals having different electrical characteristics in accordance with the optical characteristics of respective reflected light components. The sensing signals output from the photosensors PHS may be converted into an original image (or a sensor image, sensor data, or sensor image data), and may be used to identify the user's fingerprint.

As described above, the display module DM according to the present disclosure may comprise a fingerprint sensor which comprises a light-emitting element layer LDL, a sensor layer PSL, and a light-blocking layer PHL. The light-emitting element layer LDL may comprise light-emitting elements LD that may also function as light sources of photo-sensing type of fingerprint sensors. The sensor layer PSL may comprise photosensors PHS which receive reflected light that has been emitted from the light-emitting element layer LDL and is reflected from an object (e.g., a fingerprint area of the finger) located on the top of the display module DM. The light-blocking layer PHL may comprise pinholes PIH interposed between the light-emitting element layer LDL and the sensor layer PSL to selectively transmit the reflected light.

In accordance with an embodiment, the fingerprint sensor may further comprise an optical aperture formed in the display panel DP or the like (e.g., formed in the circuit-element layer BPL and the light-emitting element layer LDL) to reduce the loss of reflected light that is incident on each pinhole PIH within the range of angles of a predetermined field of view. Also, the fingerprint sensor may comprise a light control layer located in the display panel DP and configured to control an optical path so that the field of view is more easily controlled.

Meanwhile, the display module DM may also utilize the light-emitting elements LD of the pixels PXL as light sources of the fingerprint sensor, but the present disclosure is not limited thereto. For example, a display device according to other embodiments of the present disclosure may comprise a separate light source for fingerprint sensing.

Figure 6:
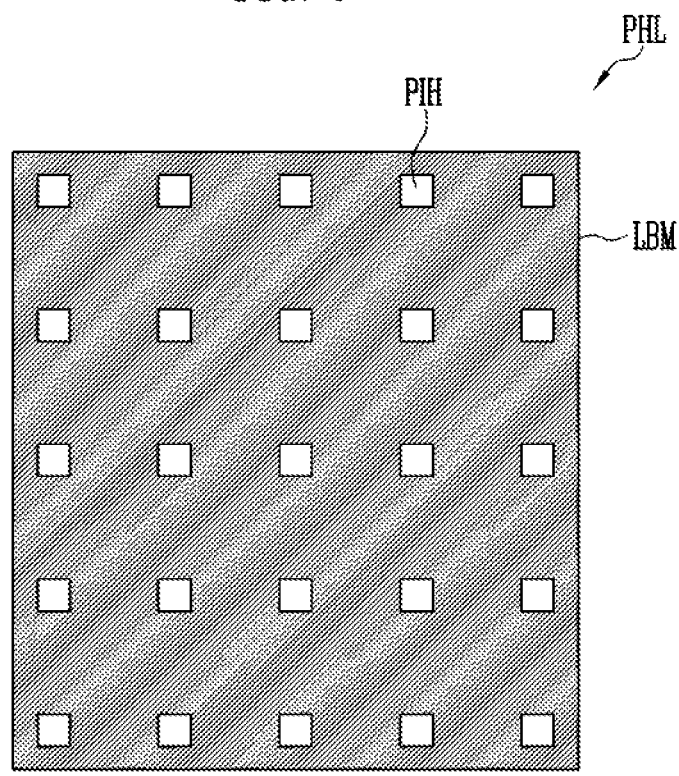
FIG. 6 is a schematic plan view illustrating a light-blocking layer according to an exemplary embodiment of the present disclosure.

FIG. 6 illustrates a light-blocking layer according to an embodiment of the present disclosure.

Referring to FIG. 6, the light-blocking layer PHL according to the present disclosure may comprise a light-blocking mask LBM and a plurality of pinholes PIH distributed over the light-blocking mask LBM.

The light-blocking mask LBM may be formed of light-blocking and/or light-absorbing materials. For example, the light-blocking mast LBM may be formed of an opaque metal layer (conductive layer) which is locally opened in portions in which individual pinholes PIH are located. However, a material used to form the light-blocking mask LBM is not limited to such a metal material, and the light-blocking mask LBM may be formed of various types of materials that are capable of blocking the transmission of light. For example, the light-blocking mask LBM may be formed of a currently known black matrix material.

The pinholes PIH may be openings distributed over the light-blocking mask LBM. The pinholes PIH may be distributed over the light-blocking mask LBM in a regular or irregular pattern to have a predetermined size and an interval.

Further, the pinholes PIH may be located at a resolution lower than that of photosensors PHS located on a sensor layer PSL. However, the present disclosure is not limited thereto, and the size, number, resolution and/or array structure of the pinholes PIH may be changed in various forms.

In the embodiment of FIG. 6, although the pinholes PIH are illustrated as having rectangular shapes, the technical spirit of the present disclosure is not limited thereto. That is, in alternate embodiments, the pinholes PIH may have various shapes, such as a rectangular, circular, elliptical, or polygonal shape.

The light-blocking layer PHL may be interposed between a light-emitting element layer LDL in which light-emitting elements LD are arranged and the sensor layer PSL in which the photosensors PHS are arranged, in the display module DM illustrated in FIG. 5. The light-blocking layer PHL may constitute an optical system for selectively transmitting only partial light and blocking the remaining light.

The light-blocking layer PHL, together with the above-described photosensors PHS, may constitute a fingerprint sensor. Further, the light-blocking layer PHL may be integrated with the circuit-element layer of the display panel 110. In this case, the module thickness of the photo-sensing type of fingerprint sensor and the display device equipped with the fingerprint sensor may be reduced or minimized.

Figure 7:
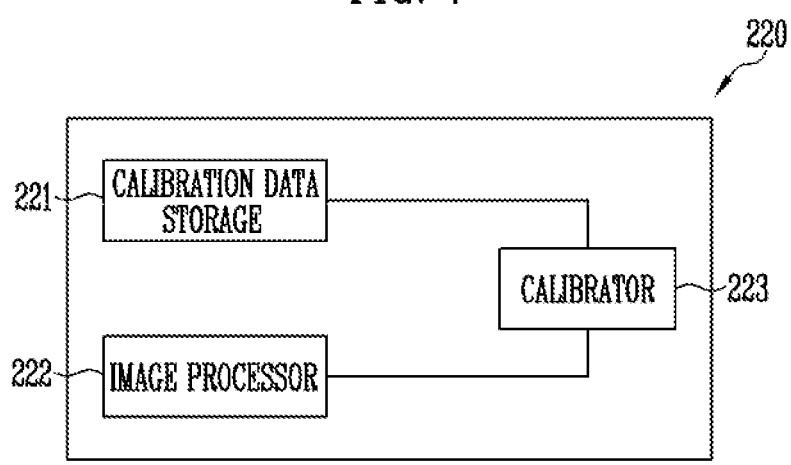
FIG. 7 is a schematic block diagram illustrating the configuration of a fingerprint detector according to an exemplary embodiment of the present disclosure.

FIG. 7 illustrates the configuration of a fingerprint detector according to an exemplary embodiment of the present disclosure.

Referring to FIGS. 5 and 7, the fingerprint detector 220 according to an embodiment of the present disclosure may comprise a calibration data storage 221, an image processor 222, and a calibrator 223. Although, in FIG. 7, the components are illustrated as being independently present, the technical spirit of the present disclosure is not limited thereto. In an embodiment, at least some of the calibration data storage 221, the image processor 222, and the calibrator 223 may be integrated into a single component or may be separated into more components. In an embodiment, the calibration data storage 221 may be a storage device separately provided outside the fingerprint detector 220 (e.g., in the panel driver 210 or the like of FIGS. 2 and 3).

White calibration and dark calibration may be defined as calibration operations of removing noise (or error or deviation) occurring in a fingerprint image, which will be described later, due to process deviations appearing in photosensors PHS, pinholes PIH, optical apertures, or the like, and then guaranteeing the uniformity of the photosensors PHS in a sensor layer PSL.

In accordance with an embodiment, a preliminary calibration device 1 (see FIG. 1) for a fingerprint sensor may generate calibration data through white calibration and dark calibration. Here, the calibration data may be defined as a calibration linear curve or calibration modeling data generated using a received light amount of the fingerprint sensor FS measured through calibration. To remove deviations between the plurality of photosensors PHS using the generated calibration data, offsets may be applied to the photosensors PHS.

The calibration data may be stored in the calibration data storage 221 (or memory) before the display module DM equipped with the fingerprint detector 220 is initially driven (e.g., before the corresponding product is shipped).

For example, the calibration data may be generated by converting sensing signals, output from the photosensors PHS into image data, in a state in which a skin color reflector and a black reflector are arranged on the display panel DP. In an example, the calibration data may be generated by converting sensing signals, output from the photosensors PHS into image data, in a state in which light corresponding to a skin color is radiated to the display panel DP. The calibration data may contain noise (or error, e.g., noise in the color of a detection target) caused by the process deviation or the like of the photosensors PHS. White calibration and dark calibration will be described in detail below with reference to FIGS. 8 to 13.

Figure 8:
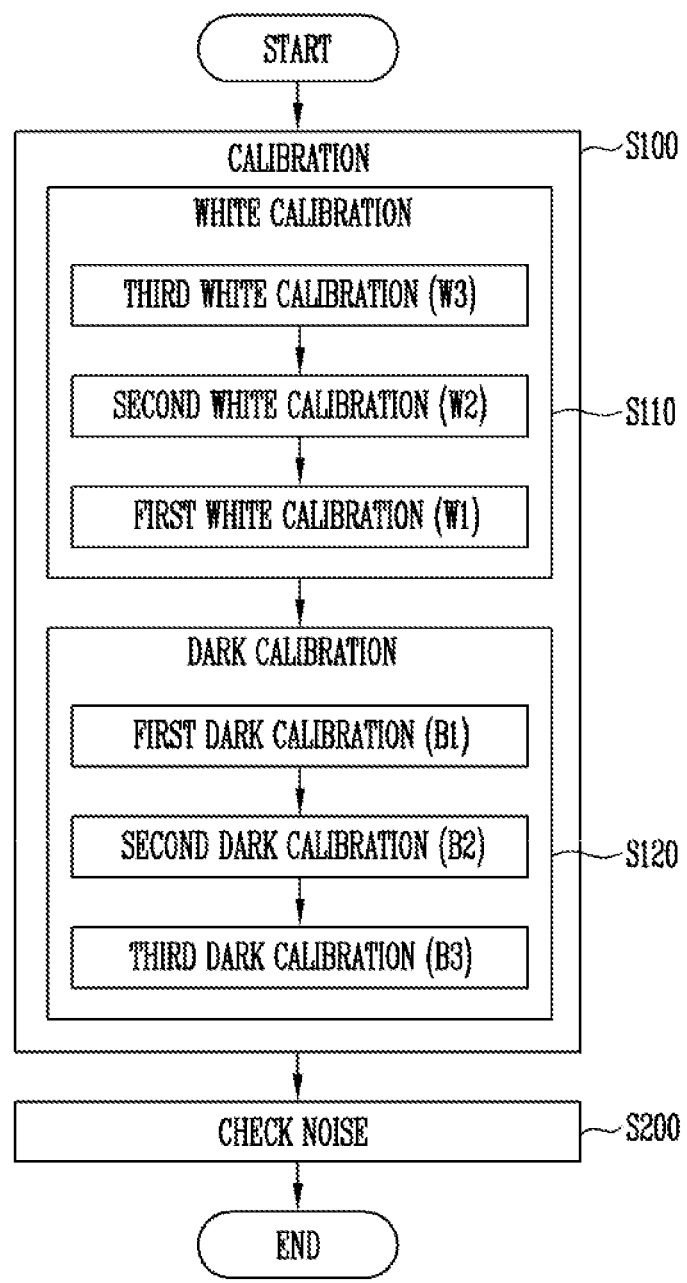
FIG. 8 is a flowchart diagram illustrating a preliminary calibration method for a fingerprint sensor according to an exemplary embodiment of the present disclosure.

FIG. 8 illustrates a preliminary calibration method for a fingerprint sensor.

Referring to FIGS. 1 and 8, the preliminary calibration method may be performed by the preliminary calibration device 1 of FIG. 1. The preliminary calibration method for the fingerprint sensor may comprise a calibration step S100 and a noise checking step S200.

In accordance with an embodiment of the present disclosure, the calibration step S100 may comprise a white calibration step S110 and a dark calibration step S120. Here, white calibration may be defined as a process of calibrating checked noise (deviation) when measurement is performed, with a skin color reflector being placed on a display module DM. For example, the skin color reflector is an object having a flat reflective surface with a reflectivity of about 70%, and the color of the reflector may be white. Dark calibration may be defined as a process of correcting checked noise (deviation) when measurement is performed, with a black reflector being placed on the display module DM. For example, the black reflector may be an object having a flat reflective surface with a reflectivity of about 50%.

The calibration step S100 may generate calibration data through the white calibration step S110 and the dark calibration step S120, and may apply offsets to a plurality of photosensors using the calibration data.

The white calibration step S110 may comprise first white calibration W1, second white calibration W2, and third white calibration W3. When first, second, and third white calibrations W1, W2, and W3 are performed, the brightness (luminance) value of the light source of the fingerprint sensor FS may sequentially increase.

For example, the driver DRV may supply first driving signals for fingerprint sensing to the pixels PXL. The first driving signals may be provided such that the pixels PXL emit light to function as light sources for the photosensors PHS. The driver DRV may supply the first driving signals so that the brightness value of the light source of the fingerprint sensor FS when third white calibration W3 is performed is higher than the brightness value of the light source of the fingerprint sensor FS when second white calibration W2 is performed. The driver DRV may supply the first driving signals so that the brightness value of the light source of the fingerprint sensor FS when second white calibration W2 is performed is higher than the brightness value of the light source of the fingerprint sensor FS when first white calibration W1 is performed.

Here, the brightness value of the light source may be a relative value. In an example, the brightness value of the fingerprint sensor FS may be about 2500 when first white calibration W1 is performed, may be about 3300 when second white calibration W2 is performed, and may be about 4700 when third white calibration W3 is performed.

Meanwhile, the dark calibration step S120 may comprise first dark calibration B1, second dark calibration B2, and third dark calibration B3. In accordance with an embodiment, the brightness value of the light source of the fingerprint sensor FS when first, second, and third dark calibrations B1, B2, and B3 are performed may be equal to the brightness value of the light source of the fingerprint sensor FS when first, second, and third white calibrations W1, W2, and W3 are performed. That is, when first, second, and third dark calibrations B1, B2, and B3 are performed, the brightness value of the light source of the fingerprint sensor FS may sequentially increase.

For example, the driver DRV may supply first driving signals so that the brightness value of the light source of the fingerprint sensor FS when third dark calibration B3 is performed is higher than the brightness value of the light source of the fingerprint sensor FS when second dark calibration B2 is performed. Further, the driver DRV may supply the first driving signals so that the brightness value of the light source of the fingerprint sensor FS when second dark calibration B2 is performed is higher than the brightness value of the light source of the fingerprint sensor FS when first dark calibration B1 is performed.

However, although the brightness values of the light source of the fingerprint sensor FS used for first, second, and third white calibrations W1, W2, and W3 and for first, second and third dark calibrations B1, B2, and B3 may be equal to each other, the reflectivity values of reflectors RUB used for white calibration and for dark calibration are different from each other, and thus received light amounts of the fingerprint FS may be different from each other in respective calibrations. Since the reflectivity of the black reflector is lower than that of the skin color reflector, the received light amounts of the fingerprint sensor FS while first, second, and third white calibrations W1, W2, and W3 are being performed may be greater than respective received light amounts of the fingerprint sensor FS while first, second and third dark calibrations B1, B2, and B3 are being performed.

Since the calibration data according to the present disclosure is generated based on the brightness values measured at three steps of white calibration, three steps of dark calibration, and in a state in which the light source is turned off between white calibration and dark calibration, errors (deviations) depending on the brightness sections of the light source and errors (deviations) depending on the states of the reflectors RUB may be further reflected in the calibration data. Therefore, compared to conventional calibration data that was generated using the brightness value in the state in which the light source is turned off and the received light amount of the fingerprint sensor FS measured through single calibration, the application of offsets may be more precisely performed.

In accordance with an embodiment of the present disclosure, the preliminary calibration method for the fingerprint sensor may comprise the noise checking step S200.

At the noise checking step S200, a second reflector having an uneven reflective surface on which irregularities are formed may be used, unlike the reflector RUB having a flat reflective surface, which is used in the white calibration step S110 and the dark calibration step S120. For example, the second reflector, which assumes the finger of the user comprising a fingerprint, may have an uneven reflective surface with irregularities and have a reflectivity of about 70%.

The noise checking step S200 may comprise the step of generating a test image using the second reflector, the step of detecting the shapes of the irregularities of the second reflector, and the step of determining whether generation of calibration data is normally performed.

For example, the step of generating the test image may capture an image of the second reflector based on sensing signals provided from the photosensors PHS. Next, at the step of detecting the shapes of irregularities of the second reflector, the shapes of irregularities of the second reflector may be detected by calibrating the test image using the calibration data generated in the white calibration step and the dark calibration step. For example, the test image may be calibrated by subtracting the calibration data from the test image. Since the calibration data contains noise, noise may be removed from the test image by means of image subtraction.

The step of determining whether generation of the calibration data is normally performed may be configured to determine whether the generation of calibration data is normally performed by analyzing the detected shapes of irregularities of the second reflector, distinguishing signals from noise, and then determining whether the calibration data satisfies a preset criterion for signal-to-noise ratio (SNR) (i.e., equal to or greater than 9 in an SNR specification (SPEC) criterion).

That is, the noise checking step S200 may be performed so as to simply check whether the generation of calibration data for the fingerprint sensor FS is normally performed using the second reflector comprising irregularities obtained by copying ridges and valleys of a fingerprint before the corresponding product is shipped, instead of using the actual fingerprint of the user.

Meanwhile, in the above description, although each of the step of performing white calibration and the step of performing dark calibration has been described as comprising three calibration steps, each step may comprise less than three calibration steps or three or more calibration steps. Since this operation may be easily inferred by those skilled in the art to which the present disclosure pertains, a detailed description thereof will be omitted.

Hereinafter, the application of offsets based on calibration data will be described in detail with reference to FIGS. 9 to 12.

Figure 9:
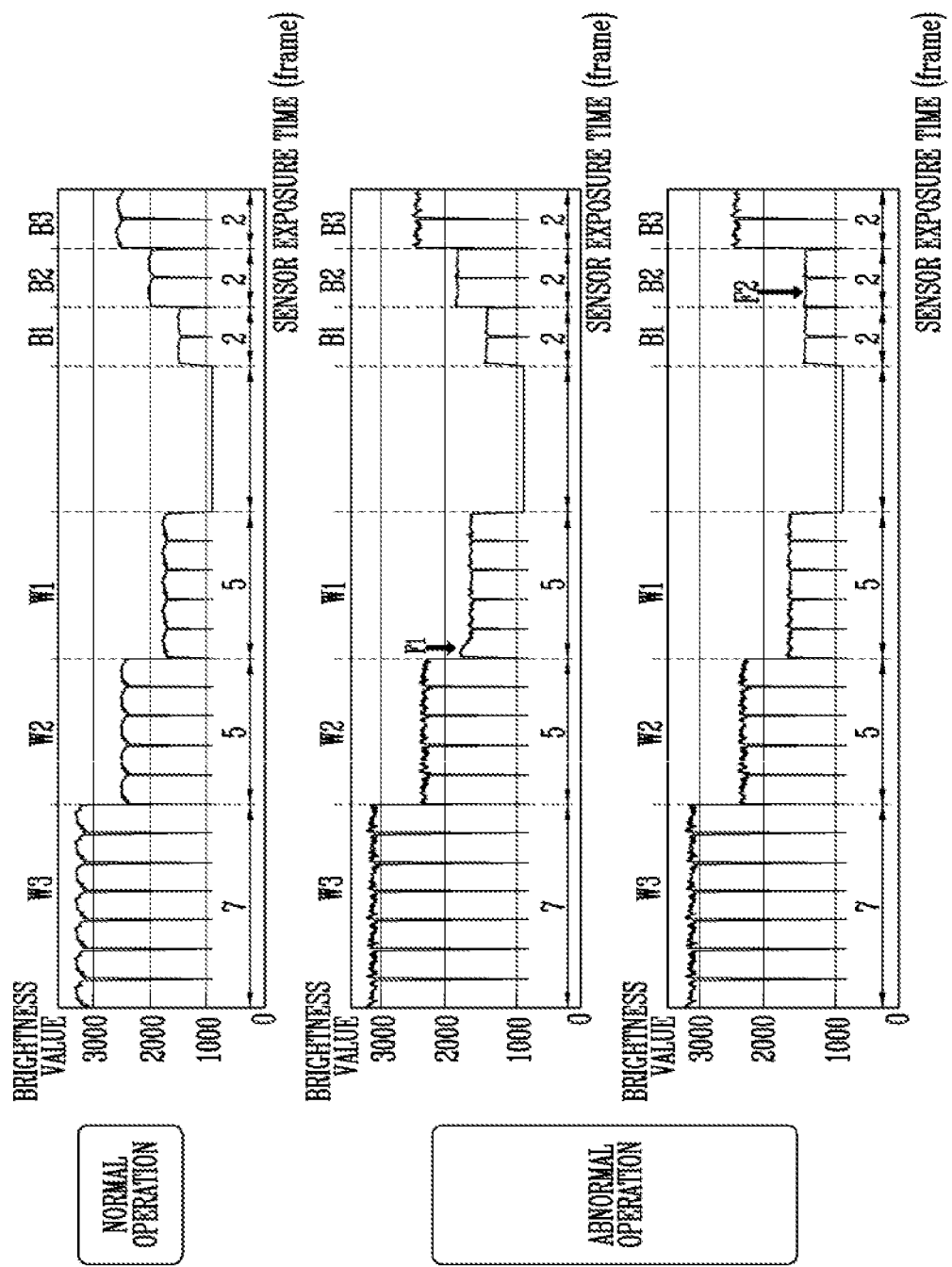
FIG. 9 is a graphical diagram illustrating a received light amount of a fingerprint sensor, measured for each section of white calibration and dark calibration according to an exemplary embodiment of the present disclosure.
Figure 10:
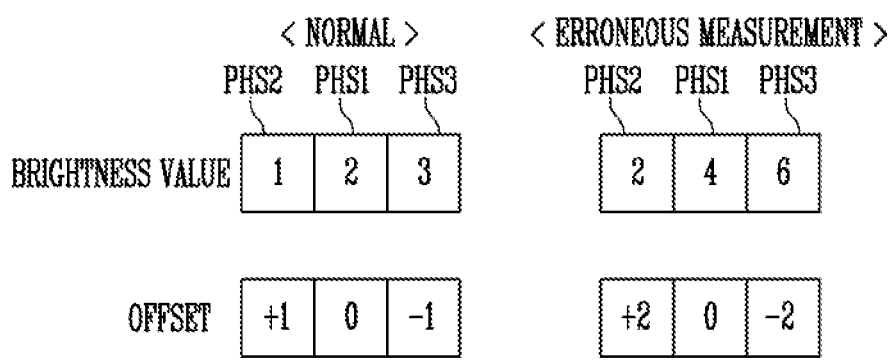
FIG. 10 is a schematic diagram illustrating deviations for respective pixels of a fingerprint sensor and application of offsets to respective pixels according to an exemplary embodiment of the present disclosure.
Figure 11:
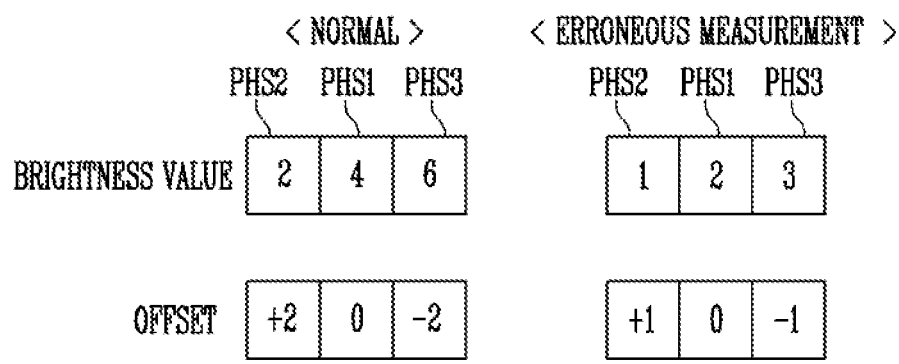
FIG. 11 is a schematic diagram illustrating deviations for respective pixels of a fingerprint sensor and application of offsets to respective pixels according to an exemplary embodiment of the present disclosure.

FIG. 9 illustrates a received light amount of a fingerprint sensor, measured for each section of white calibration and dark calibration. FIG. 10 illustrates deviations for respective pixels of a fingerprint sensor and application of offsets to the respective pixels. FIG. 11 illustrates deviations for respective pixels of a fingerprint sensor and application of offsets to the respective pixels.

Referring to FIGS. 8 and 9, the white calibration step S110 may be performed in the sequence of third white calibration W3, second white calibration W2, and first white calibration W1. Meanwhile, the dark calibration step S120 may be performed in the sequence of first dark calibration B1, second dark calibration B2, and third dark calibration B3.

The horizontal axis of the graph illustrated in FIG. 9 indicates time (frames) at which the fingerprint sensor FS is exposed for respective calibration sections, and the vertical axis of the graph indicates brightness values relative to received light amounts of the fingerprint sensor FS for respective sections.

The light reception period of the sensor layer PSL in the white calibration step S110 may be longer than that of the sensor layer PSL in the dark calibration step S120. As illustrated in FIG. 9, the white calibration step S110 may have a total of 17 frames, whereas the dark calibration step S120 may have a total of 11 frames comprising five frames, indicating the state in which the light source of the fingerprint sensor FS is turned off.

Also, the light reception period of the sensor layer PSL in third white calibration W3 may be longer than those of the sensor layer PSL in first and second white calibrations W1 and W2. As illustrated in FIG. 9, third white calibration W3 may have seven frames, whereas first and second white calibrations W1 and W2 may each have five frames.

This is due to the assumption that the usage environment of the fingerprint sensor FS is generally similar to an environment in which third white calibration W3 is performed. That is, when a fingerprint is sensed through the fingerprint sensor FS, the brightness value of the light source is about 4700, which may be maintained in a bright state.

When the graph indicating a normal operation is compared to graphs indicating an abnormal operation, it can be seen that the difference between the received light amounts of the fingerprint sensor FS has occurred at a first point F1 and a second point F2.

The first point F1 indicates an abnormal state, that is, a case where a brightness value of about 2000 is measured even if the received light amount of the fingerprint sensor FS should have a brightness value of about 1746 in a normal state while first white calibration W1 is being performed. That is, this shows the case where the received light amount of the fingerprint sensor FS is measured as a value corresponding to the state brighter than the normal state. In this case, to describe a problem that may occur, FIG. 10 will be referred to.

In FIG. 10, for convenience of description, a description will be made on the assumption that the brightness value of a first photosensor PHS1 having a brightness value of about 1746 is replaced with 2. Assuming that the brightness value of a second photosensor PHS2 arranged adjacent to the first photosensor PHS1 is 1 and the brightness value of a third photosensor PHS3 is 3, offsets may be applied for uniformity of the first, second and third photosensors PHS1 to PHS3. That is, since the first photosensor PHS1 is a reference, an offset of 0 may be applied to the first photosensor PHS1, an offset of +1 may be applied to the second photosensor PHS2 so as to compensate for the difference with the first photosensor PHS1, and an offset of −1 may be applied to the third photosensor PHS3 so as to compensate for the difference with the first photosensor PHS1.

However, in the abnormal state, such as at the first point F1, in which the received light amount of the fingerprint sensor FS is measured as a value corresponding to a state brighter than the normal state, respective brightness values of the first, second and third photosensors PHS1 to PHS3 may be 2, 4, and 6. For uniformity of the first, second and third photosensors PHS1 to PHS3, offsets may be applied to the photosensors PHS1 to PHS3. That is, since the first photosensor PHS1 is a reference, an offset of 0 should be applied to the first photosensor PHS1, an offset of +2 should be applied to the second photosensor PHS2 so as to compensate for the difference with the first photosensor PHS1, and an offset of −2 should be applied to the third photosensor PHS3 so as to compensate for the difference with the first photosensor PHS1.

Therefore, even if offsets of +1, 0, and −1 should be applied to the first, second and third photosensors PHS1 to PHS3, respectively, when the received light amount of the fingerprint sensor FS is in a normal state, offsets of +2, 0, and −2 are applied thereto, and thus calibration may not be normally performed.

The second point F2 indicates an abnormal state, that is, a case where a brightness value of about 1533 is measured even if the received light amount of the fingerprint sensor FS should have a brightness value of about 2107 in a normal state while second dark calibration B2 is being performed. That is, this shows the case where the received light amount of the fingerprint sensor FS is measured as a value corresponding to a state darker than the normal state. In this case, to describe a problem that may occur, FIG. 11 will be referred to.

In FIG. 11, for convenience of description, a description will be made on the assumption that the brightness value of a first photosensor PHS1 having a brightness value of about 2107 is replaced with 4. Assuming that the brightness value of a second photosensor PHS2 arranged adjacent to the first photosensor PHS1 is 2 and the brightness value of a third photosensor PHS3 is 6, offsets may be applied for uniformity of the first, second and third photosensors PHS1 to PHS3. That is, since the first photosensor PHS1 is a reference, an offset of 0 may be applied to the first photosensor PHS1, an offset of +2 may be applied to the second photosensor PHS2 so as to compensate for the difference with the first photosensor PHS1, and an offset of −2 may be applied to the third photosensor PHS3 so as to compensate for the difference with the first photosensor PHS1.

However, in an abnormal state, such as at the second point F2, in which the received light amount of the fingerprint sensor FS is measured as a value corresponding to a state darker than the normal state, respective brightness values of the first, second and third photosensors PHS1 to PHS3 may be 1, 2, and 3. For uniformity of the first, second and third photosensors PHS1 to PHS3, offsets may be applied to the photosensors PHS1 to PHS3. That is, since the first photosensor PHS1 is a reference, an offset of 0 should be applied to the first photosensor PHS1, an offset of +1 should be applied to the second photosensor PHS2 so as to compensate for the difference with the first photosensor PHS1, and an offset of −1 should be applied to the third photosensor PHS3 so as to compensate for the difference with the first photosensor PHS1.

Therefore, even if offsets of +2, 0, and −2 should be applied to the first, second and third photosensors PHS1 to PHS3, respectively, when the received light amount of the fingerprint sensor FS is in a normal state, offsets of +1, 0, and −1 are applied thereto, and thus calibration may not be normally performed.

Figure 12:
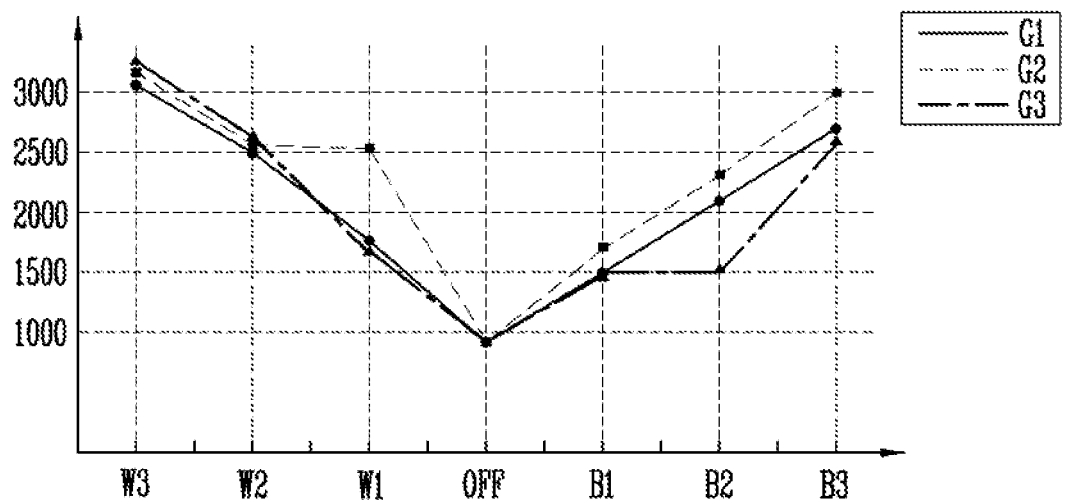
FIG. 12 is a graphical diagram illustrating calibration data according to an exemplary embodiment of the present disclosure.

FIG. 12 illustrates calibration data according to an embodiment of the present disclosure.

Referring to FIG. 12, the horizontal axis of the graph indicates a plurality of steps of calibration, and the vertical axis of the graph indicates brightness values relative to received light amounts of the fingerprint sensor FS at respective steps.

The following Table 1 shows values obtained by measuring the received light amounts of the fingerprint sensor FS while the above-described first, second and third white calibrations W1 to W3 and first, second and third dark calibrations B1 to B3 are being performed. As described above with reference to FIGS. 9 to 11, in comparison with a normal state, abnormal state 1 may comprise the first point F1 at which an abnormality occurs while first white calibration W1 is being performed, and abnormal state 2 may comprise the second point F2 at which an abnormality occurs while second dark calibration B2 is being performed.

TABLE 1

| Type | W3 | W2 | W1 | B1 | B2 | B3 |
|---|---|---|---|---|---|---|
| Normal | 3299 | 2500 | 1746 | 1533 | 2107 | 2715 |
| Abnormal 1 | 3309 | 2504 | 2503(F1) | 1793 | 2373 | 3110 |
| Abnormal 2 | 3335 | 2586 | 1700 | 1511 | 1533(F2) | 2632 |

When Table 1 is represented by a graph, a plurality of curves may be indicated, as illustrated in FIG. 12. A first curve G1 is indicated by a solid line, a second curve G2 is indicated by a dotted line, and a third curve G3 is indicated by a dashed dotted line.

The first curve G1 may indicate calibration data generated in a normal state. Here, the calibration data may be defined as a calibration linear curve or calibration modeling data generated using a received light amount of the fingerprint sensor FS measured through calibration.

The second curve G2 may indicate calibration data corresponding to abnormal state 1. In the second curve G2, a received light amount of the fingerprint sensor FS in first white calibration W1 is erroneously measured, and thus the second curve G2 may be different from the first curve G1 at the first point F1.

The third curve G3 may indicate calibration data corresponding to abnormal state 2. In the third curve G3, a received light amount of the fingerprint sensor FS in second dark calibration B2 is erroneously measured, and thus the third curve G3 may be different from the first curve G1 at the second point F2.

Hereinafter, a method of modifying calibration data in an abnormal state while preliminary calibration of the fingerprint sensor is being performed, and then generating calibration data in a normal state will be described in detail with reference to FIG. 13.

Figure 13:
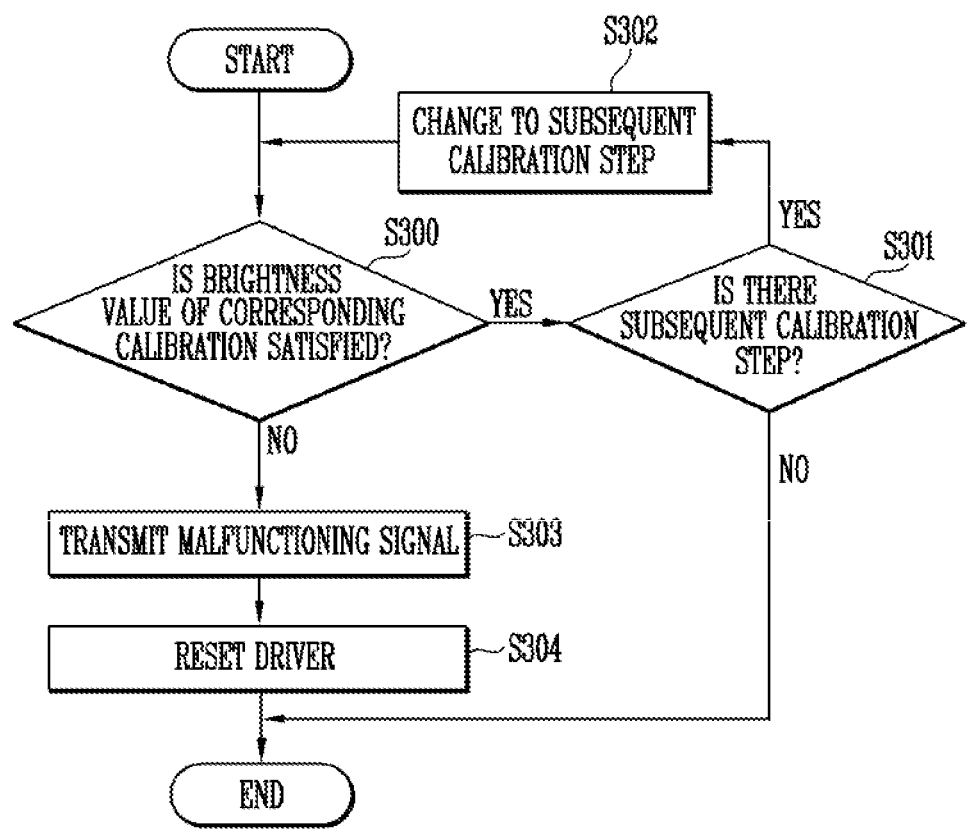
FIG. 13 is a flowchart diagram illustrating a method of detecting and repairing malfunctions during preliminary calibration of a fingerprint sensor according to an exemplary embodiment of the present disclosure.

FIG. 13 illustrates a method of detecting and repairing malfunctioning during preliminary calibration of a fingerprint sensor.

Referring to FIGS. 1 to 3, 8, and 13, the preliminary calibration device 1 for the fingerprint sensor may perform the calibration step S100. The calibration step S100 may comprise a process of performing first, second and third white calibrations W1 to W3 and first, second and third dark calibrations B1 to B3.

The process of performing first, second and third white calibrations W1 to W3 and first, second and third dark calibrations B1 to B3 may comprise the step of generating calibration data.

The step of generating the calibration data may comprise the step S300 of measuring received light amounts of the sensor layer at respective steps of first, second and third white calibrations and first, second and third dark calibrations, checking whether the received light amounts fall within a preset range, and then determining whether the corresponding calibration step is a normal operation at step S300.

Here, the preset range may be designated such that a brightness value corresponding to the received light amount of the sensor layer, which is higher than a reference brightness value by the threshold amount of 400 cd/m², for example, is set as an upper limit and such that a brightness value corresponding to the received light amount of the sensor layer, which is lower than the reference brightness value by the threshold amount of 400 cd/m², for example, is set as a lower limit. However, this range is merely exemplary, and may be varied depending on the size, resolution, and pixel structure of the display panel DP.

At the step S300 of determining whether the generation of calibration data is normally performed, the process may move from a previous calibration step to a subsequent calibration step when the result of the previous calibration step indicates a normal state. When there is no subsequent calibration step at step S301, it may be considered that the calibration data in the normal state is finally generated, and the process may be terminated, whereas when there is any subsequent calibration step, whether the corresponding calibration step is a normal operation may be determined at step S302.

For example, referring to the above-described Table 1, in the normal state, brightness values of first, second and third white calibrations W1 to W3 and first, second and third dark calibrations B1 to B3 are normal, and thus it may be considered that the calibration data in the normal state is finally generated, and the process may be terminated.

Meanwhile, in abnormal state 1, the brightness values of third white calibration W3 and second white calibration W2 are values falling within the preset range, compared to the reference brightness value, and thus these brightness values may be determined to be those in the normal state. Since first white calibration W1, which is a calibration step subsequent to second white calibration W2, is present, whether the corresponding calibration step is a normal operation is determined. Since a case where the brightness value of first white calibration W1 is measured as 2503 may correspond to a case where the brightness value is greater than 2146 that is the upper limit from a brightness value of 1746 in the normal state, it may be determined that the brightness value is a value in an abnormal state. Similarly, the case of abnormal state 2 may be determined to be an abnormal state when determining whether the step of second dark calibration B2 is a normal operation.

The step of generating calibration data may comprise the step S303 of, when it is determined that the corresponding calibration step is an abnormal operation based on the result of normal operation determination, transmitting a signal commanding the driver DRV to be reset, and the step S304 of resetting the driver DRV of the preliminary calibration device 1 for the fingerprint sensor in response to the signal.

When at least one step is determined to be an abnormal operation during the process for performing first, second and third white calibrations W1 to W3 and first, second and third dark calibrations B1 to B3, the driver DRV of the preliminary calibration device 1 for the fingerprint sensor may be reset, and the calibration step S100 may be performed again.

There may be various causes resulting in abnormal operations (states). For example, the malfunctioning of the fingerprint sensor FS, the malfunctioning of a control IC for performing control, the malfunctioning of a driver for controlling a luminance level of a light source, or the like may be the causes of abnormal operations. The effect of solving the above-described causes may be expected by resetting the driver DRV.

Also, when at least one step is determined to be an abnormal operation during the process for performing first, second and third white calibrations W1 to W3 and first, second and third dark calibrations B1 to B3, accurate calibration data may be generated by re-performing the calibration step S100. Because of this, since accurate offsets may be applied, the uniformity of the plurality of photosensors PHS may be secured.

FIG. 14 illustrates a calibration method for a display device according to an embodiment of the present disclosure.

Referring to FIGS. 1 to 3 and 8 to 14, the display device may indicate a state in which the display module DM has been shipped, and may define a configuration in which all of components of the display module DM are comprised and in which various types of sensors, a camera, and an external casing are further attached to the display module DM. Although not illustrated in the drawings, the display module DM may further comprise a memory which stores calibration data generated through the above-described preliminary calibration of the fingerprint sensor.

The display device may generate a first fingerprint image by capturing an image of a user's fingerprint through the fingerprint detector 220 at step S400. In this case, the brightness value of the first fingerprint image may differ from the brightness value of a test image of a second reflector calculated through the preliminary calibration process for the fingerprint sensor due to changes in a usage environment, such as the force, position, and distance of the finger of the user who touches the display panel DP, and/or external factors, such as dirt, scratches or other degradation of the display panel DP. Accordingly, the quality of the captured image may be reduced, and thus a fingerprint recognition rate may be decreased.

Therefore, the display device may read the calibration data stored in the memory from the memory when the first fingerprint image is generated at step S401.

Thereafter, based on the brightness value of the first fingerprint image and the calibration data, the display device may compare the brightness value of the first fingerprint image with the brightness value of the calibration data corresponding to the brightness value of the first fingerprint image at step S402, and may consider that an optimal fingerprint image has been generated and then terminate the process when the difference therebetween is within a preset range. In contrast, the display device may compare the brightness value of the first fingerprint image with the brightness value of the calibration data corresponding to the brightness value of the first fingerprint image at step S402, and may adjust the brightness values (or gamma) of the light-emitting elements LD through the panel driver 210 at step S403 when the difference therebetween is outside of the present range.

For example, when the brightness value of the first fingerprint image is 2800 cd/m$^2$, for example, and the brightness value of calibration data that corresponds to the brightness value of the first fingerprint image and that is read from the memory is 3200 cd/m$^2$, for example, the display device may adjust the brightness value so that the brightness value of the first fingerprint image is increased by the difference of 400 cd/m$^2$ through the panel driver 210.

Thereafter, the display device may generate a second fingerprint image having an optimal brightness value by re-capturing an image of the user's fingerprint through the fingerprint detector 220 at step S404.

The calibration method for a fingerprint sensor according to an embodiment of the present disclosure may improve the precision of calibration of the fingerprint sensor by generating calibration data for various luminance levels.

The calibration method for a fingerprint sensor according to an embodiment of the present disclosure may further improve the precision of calibration of the fingerprint sensor by determining whether the corresponding calibration is within a normal operation range for each brightness level and by resetting a driver when the corresponding calibration is in an abnormal operation range.

Those of ordinary skill in the pertinent art to which the present disclosure pertains will understand that the present disclosure may be practiced in other detailed forms without departing from the technical scope or spirit thereof. Therefore, it should be understood that the above-described embodiments are only exemplary in all aspects rather than being restrictive. It is intended that the scope of the present disclosure should be defined by the accompanying claims rather than the above-described descriptions, such that various modifications, additions and substitutions, which can be derived from the meaning, scope and equivalent concepts of the present disclosure, fall within the scope of the accompanying claims and their equivalents.

What is claimed is:

1. A calibration method for calibrating a fingerprint sensor comprising a plurality of photosensors, the calibration method comprising:
   generating calibration data through white calibration and dark calibration; and
   applying offsets to the plurality of photosensors using the calibration data,
   wherein the white calibration comprises first, second and third white calibration operations of measuring received light amounts corresponding to first, second and third brightness values, respectively,
   wherein the dark calibration comprises first, second and third dark calibration operations of measuring received light amounts corresponding to the first, second and third brightness values, respectively, and
   wherein the third brightness value of a plurality of light-emitting elements is higher than the second brightness value, and the second brightness value is higher than the first brightness value.

2. The calibration method according to claim 1, wherein:
   the fingerprint sensor further includes a substrate, a light-blocking layer located on a first surface of the substrate and having openings formed in a light-blocking mask, and a sensor layer located on a second surface of the substrate and having the plurality of photosensors, and
   generating the calibration data comprises disposing a first reflector having a flat reflective surface on the first surface of the substrate so that the first reflector overlaps the sensor layer in a thickness direction.

3. The calibration method according to claim 2, wherein:
   the first reflector comprises a skin color reflector and a black reflector, and
   the white calibration is performed using the skin color reflector, and the dark calibration is performed using the black reflector.

4. The calibration method according to claim 2, wherein:
   a light-emitting element layer is located on the light-blocking layer and has the light-emitting elements,
   the white calibration comprises the first, second and third white calibration operations of measuring the received light amounts of the sensor layer corresponding to the first, second and third brightness values of the light-emitting elements, respectively, and
   the dark calibration comprises the first, second and third dark calibration operations of measuring the received light amounts of the sensor layer corresponding to the first, second and third brightness values of the light-emitting elements, respectively.

5. The calibration method according to claim 2, wherein a light reception period of the sensor layer in the white calibration is longer than a light reception period of the sensor layer in the dark calibration.

6. The calibration method according to claim 4, wherein a light reception period of the sensor layer in the first white calibration operation is longer than a light reception period of the sensor layer in each of the second and third white calibration operations.

7. The calibration method according to claim 4, wherein generating the calibration data further comprises:
measuring a received light amount of the sensor layer in each of the first, second and third white calibration operations and in each of the first, second and third dark calibration operations; and
determining whether a corresponding calibration operation is a normal operation by checking whether the measured received light amount of the sensor layer is within a preset range.

8. The calibration method according to claim 7, wherein the preset range is designated such that a brightness value corresponding to the received light amount of the sensor layer, which is higher than a reference brightness value by a threshold amount, is set as an upper limit and such that the brightness value corresponding to the received light amount of the sensor layer, which is lower than the reference brightness value by the threshold amount, is set as a lower limit.

9. The calibration method according to claim 8, wherein a panel driver configured to control brightness values of the light-emitting elements is used.

10. The calibration method according to claim 9, further comprising:
generating a test image of a second reflector comprising an uneven reflective surface with an irregularity based on sensing signals provided from the photosensors;
detecting a shape of the irregularity of the second reflector by calibrating the test image using the calibration data;
performing a noise checking operation of determining whether generation of the calibration data is normally performed based on the shape of the irregularity of the second reflector; and
resetting the panel driver when the received light amount of the sensor layer is outside of the preset range.

11. A program storage device tangibly embodying a program of non-transient instructions executable by a processor for calibrating a fingerprint sensor, the instructions comprising:
generating calibration data through white calibration and dark calibration; and
applying offsets to a plurality of photosensors based on the calibration data,
wherein the white calibration is performed using a substantially skin-colored reflector and the dark calibration is performed using a substantially gray-colored reflector,
wherein white calibration comprises first, second and third white calibration operations of measuring received light amounts corresponding to first, second and third brightness values, respectively,
wherein the dark calibration comprises first, second and third dark calibration operations of measuring received light amounts corresponding to the first, second and third brightness values, respectively, and
wherein the third brightness value of a plurality of light-emitting elements is higher than the second brightness value, and the second brightness value is higher than the first brightness value.

* * * * *